United States Patent [19]

Shimajiri

[11] Patent Number: 5,319,839
[45] Date of Patent: Jun. 14, 1994

[54] BOARD CLAMP

[75] Inventor: Naohiro Shimajiri, Toyota, Japan

[73] Assignee: Nifco Inc., Kanagawa, Japan

[21] Appl. No.: 991,555

[22] Filed: Dec. 15, 1992

[30] Foreign Application Priority Data

Dec. 16, 1991 [JP] Japan .................. 3-360929

[51] Int. Cl.5 ............................. F16B 21/00
[52] U.S. Cl. ...................... 24/453; 24/297; 24/573.1; 411/510
[58] Field of Search ............. 24/543, 289, 297, 573.1; 411/508, 510, 509, 913

[56] References Cited

U.S. PATENT DOCUMENTS

| | | | |
|---|---|---|---|
| 3,577,603 | 5/1971 | Seckerson et al. | 411/510 |
| 3,836,703 | 9/1974 | Coules . | |
| 4,261,243 | 4/1981 | Palmer | 24/297 |
| 4,472,918 | 9/1984 | Mach | 24/289 |
| 4,715,095 | 12/1987 | Takahashi | 411/508 |
| 5,005,265 | 4/1991 | Muller | 24/453 |

FOREIGN PATENT DOCUMENTS

| | | |
|---|---|---|
| 63-115908 | 7/1988 | Japan . |
| 63-154808 | 10/1988 | Japan . |
| 64-17014 | 1/1989 | Japan . |
| 2-60707 | 5/1990 | Japan . |
| 3-113108 | 5/1991 | Japan . |
| 3-117114 | 12/1991 | Japan . |
| 2026083 | 1/1980 | United Kingdom . |
| 2209185 | 5/1989 | United Kingdom . |

Primary Examiner—Victor N. Sakran
Attorney, Agent, or Firm—Wenderoth, Lind & Ponack

[57] ABSTRACT

A board clamp including a head portion and a leg portion having a rigid axial stem and elastic engaging pieces arranged around the axial stem is adapted to secure various objects to a board or panel by inserting the leg portion into a fitting hole formed in the board. Since the leg portion is supported by the rigid axial stem, it is steadily inserted and retained in the fitting hole without being deformed or broken even when being inserted slantwise or subjected to a relatively large load.

10 Claims, 6 Drawing Sheets

BOARD CLAMP

BACKGROUND OF THE INVENTION

1. Field of the Invention

This invention relates to a board clamp made of a plastic material and designed to fulfill a variety of useful purposes such as of fastening various component parts to a body of an automobile, a chassis of an electric appliance or the like, and particularly, steadily clamping two boards or panels.

2. Description of the Prior Art

A variety of panel-to-panel clamping devices so-called "board clamps" made of a plastic material are used in automobiles and electric appliances. The board clamps have various shapes in accordance with the forms of objects such as panel-like parts or articles to be fastened, but each fundamentally comprises a head member which is larger in diameter than a fitting hole formed in a board or panel, and a leg member extending downward from the head member so as to be fitted into the fitting hole. The head member generally has hooking means or a flange or other specific shape so as to be engaged with one of the objects to be clamped together. The leg member has a generally somewhat larger outer diameter than the fitting hole formed in the other object to be fastened so as not to come out of the fitting hole. With the clamping devices of this type, two boards or any other articles can be steadily clamped to each other with a simple operation.

For example, Japanese Utility Model Applications Nos. SHO 64-17014, HEI 2-60707, HEI 3-113108 and HEI 3-117114 suggest board clamps each comprising an anchor-shaped leg having a pair of engaging pieces inclined upward from the lower end of an axial stem. Also, in Japanese Utility Model Application No. SHO 63-154808, there is proposed a board clamp having stem-less engaging legs. In addition, Japanese Utility Model Appln. No. SHO 63-115903 discloses a clip having one or more leg members formed of a corrugated plate.

All of these conventional board clamps have been designed dependent on the shape of a molding die used in plastic injecting molding. That is, the former four board clamps each are featured by the side engaging pieces laterally protruding in the opposite directions from the axial stem, but no engaging piece is disposed on the front and rear sides. On the other hand, the board clamp of Japanese U. M. Appln. No. SHO 63-154808 as noted above possesses no stem along the axial center of the engaging legs arranged in a circle because of technical reasons in the plastic injection molding no matter that the stem is necessary. The corrugated leg member in the clip of Japanese U. M. Appln. No. SHO 63-115908 is designed so as to be fitted as tight as possible into a fitting hole formed in a board or panel, but a stem is also not provided in this conventional clip.

Discussing a few points about the aforementioned prior art clamps, the board clamp having the anchor-shaped leg cannot withstand a load which is applied thereto in the direction perpendicular to the directions in which the engaging pieces protrude oppositely from the axial stem, and thus, will be easily slackened or will cease to function due to a shock, vibration or any other possible cause.

The board clamp comprising the stem-less engaging legs insufficiently retains a plate-like object in position, and therefore, will possibly be slackened or ruined when being subjected a relatively large load.

Considering the existing technique of plastic injection molding, it will be difficult to all together eliminate these drawbacks suffered by the conventional board clamps.

Further, there has been another board clamp having a hollow engaging leg of a plastic material to utilize its elasticity to be elastically fitted into a fitting hole bored in a board or panel. The hollow engaging leg is first retracted resiliently inward when being inserted into the fitting hole in the board, and resumes its original shape when being completely fitted in the fitting hole. This board clamp is easy to handle, providing advantageous uniting of the boards.

However, the board clamp utilizing the elasticity of the plastic hollow engaging leg in being inserted into the fitting hole in the board is not quite rigid, and thus, it cannot steadily retain the boards or the like in position. Although the board clamp may be successfully fitted into the fitting hole when perpendicularly inserting the elastic engaging leg through the center of the fitting hole in the board, the elastic engaging leg will be deformed or broken when being inserted slantwise into the fitting hole or coming in touch with the edge of the fitting hole during the inserting. As a result, the board clamp may possibly be deprived of its function. This disadvantage becomes particularly conspicuous when a board or other possible article is secured to a fundamental substrate with a plurality of clamps of this type. The case in which a trim board as an upholstery plate is anchored to the inside of a car door is one example entailing such a disadvantage. That is, when the trim board is fixed onto the inside of the car door, in general, a number of the board clamps are previously attached to the back side of the trim board at prescribed intervals, and then, fitted into corresponding fitting holes formed in the inside of the car door at one time while bringing the trim board in a face-to-face union with the car door. However, at this time, the clamps often fail to be fitted into the fitting holes due to the inequality of the positions on the trim board to which the clamps are attached and an error in measurement in making the fitting holes.

Not infrequently, there are times when the trim board is incompletely mounted on the car door, because it is difficult to visually inspect the condition of the attachment of the board clamps interposed between the trim board and car door.

SUMMARY OF THE INVENTION

This invention is the outcome of an effort directed to overcoming the unfavorable state of affairs described above. An object of this invention is to provide a board clamp capable of reliably clamping boards or panels or steadily retaining various articles in position on a substrate with a simple operation, and securely maintaining the clamping state even when being objected to a large load in all directions.

Another object of this invention is to provide a board clamp having a structure capable of reliably securing the various articles or board-like objects, which can easily be molded of a plastic material without using complicated molding die in the plastic injection molding thereof.

Still another object of this invention is to provide a board clamp having a leg portion which can readily be fitted into a fitting hole formed in a board or plate without being deformed or broken even when being inserted into the fitting hole slantwise to some extent.

To attain the objects described above according to this invention there is provided a board clamp which comprises a head portion and a leg portion extending downward from the head portion and having an axial stem being smaller in diameter than a fitting hole formed in a board or panel and elastic engaging pieces arranged around the axial stem and having outer side surfaces spaced a distance larger than the diameter of the fitting hole, which engaging pieces are substantially separated radially from the circumferential surface of the axial stem in a radially retractable state.

The axial stem may be shaped in a cross in transverse section to form four fins with the engaging pieces located in the spaces defined between the circumferentially adjacent fins in such a state that the middle portions of the engaging pieces are apart from the axial stem and connected at their upper and lower ends to the axial stem. Thus, the engaging pieces are resiliently retracted radially or bent inwardly when the leg portion is inserted into the fitting hole in the board or panel. Since the resiliently retractable engaging pieces are arranged uniformly around the axis of the axial stem, the leg portion has sufficient and uniform persistence against the load applied thereto in all directions.

By accepting the restrictions in structure of a molding die used in plastic injection molding, the axial stem may have a substantially T or Y shape in transverse cross section to form three fins.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

This invention will become more fully understood from the detailed description given hereinbelow and the accompanying drawings which are given by way of illustration only, and thus are not limitative of this invention.

FIG. 1 through FIG. 5 illustrate the first embodiment of the board clamp according to this invention, which is applied for fixing a trim board B used as upholstery plate to the inside panel A of a car door as one example.

The board clamp of this invention is molded of a plastic material such as polyacetal having moderate elasticity and rigidity, and comprises a head portion 1 and a leg portion 2.

The head portion 1 in this embodiment has double flanges 1a and 1b which are adapted to be held fast to the trim board B. The lower flange 1a is somewhat larger in diameter than the upper flange 1b. To be more specific, the head portion 1 is formed by a neck portion 1c extending upwardly from the lower flange 1a and the upper flange 1b disposed on the neck portion 1c so as to hold that a part of the trim board B can be held between the flanges 1a and 1b.

On the other hand, the leg portion 2 is inserted into a fitting hole a formed in the panel A and engaged with the circumferential edge of the panel defining hole a. The leg portion 2 comprises a rigid axial stem 2a extending downward from the lower surface of the head portion 1 and elastic engaging pieces 2b arranged generally parallel to the axial stem 2a.

The head portion 1 in this embodiment further comprises an umbrella-like resilient seal member 3 under the large flange 1a, which has a diameter sufficient to completely close the fitting hole a bored in the panel A when inserting the leg portion 2 into the fitting hole. Therefore, the leg portion 2 comprising the axial stem 2a and engaging pieces 2b is connected to the head portion 1 through the seal member 3.

Figure 1:
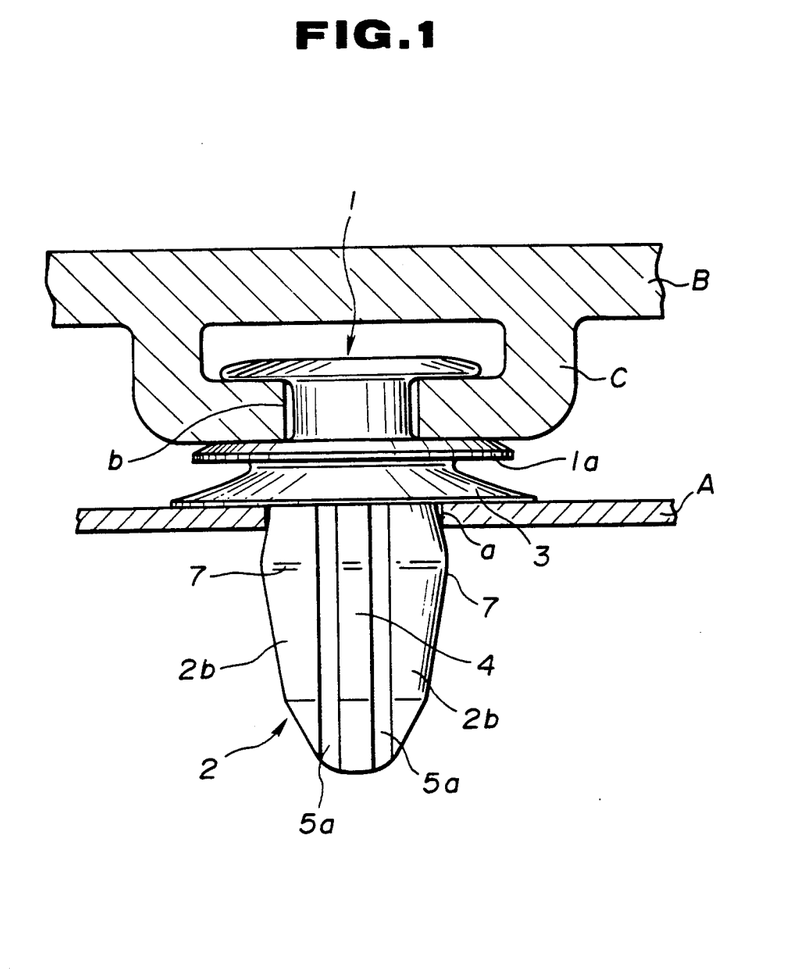
FIG. 1 is a front view of one embodiment of the board clamp in use according to the present invention.
Figure 2:
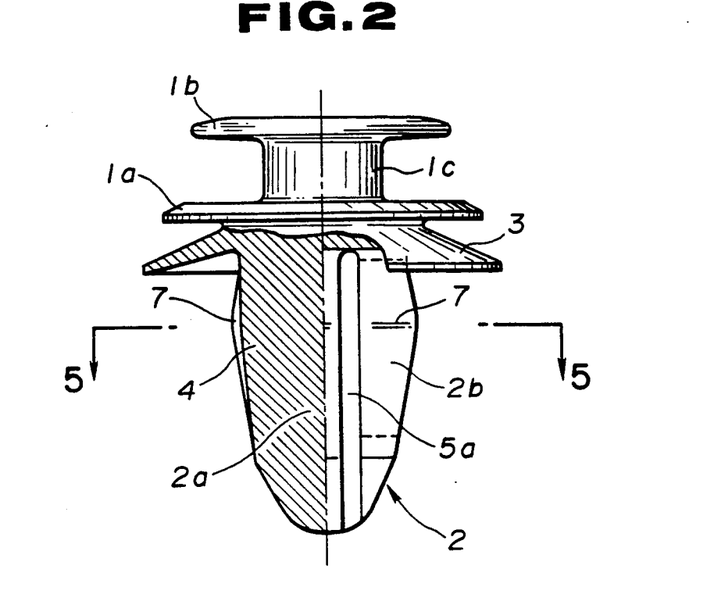
FIG. 2 is a partly cutaway front view of the same.
Figure 3:
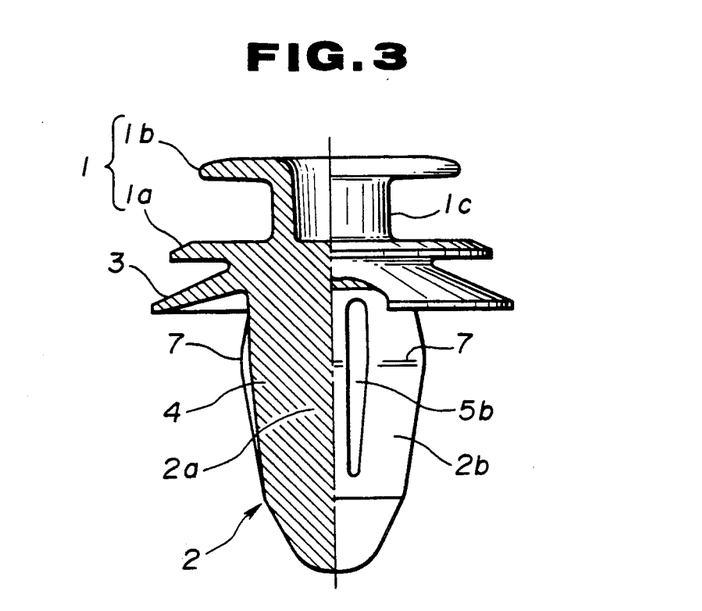
FIG. 3 is a right side view, partly in axial section, of the same.
Figure 4:
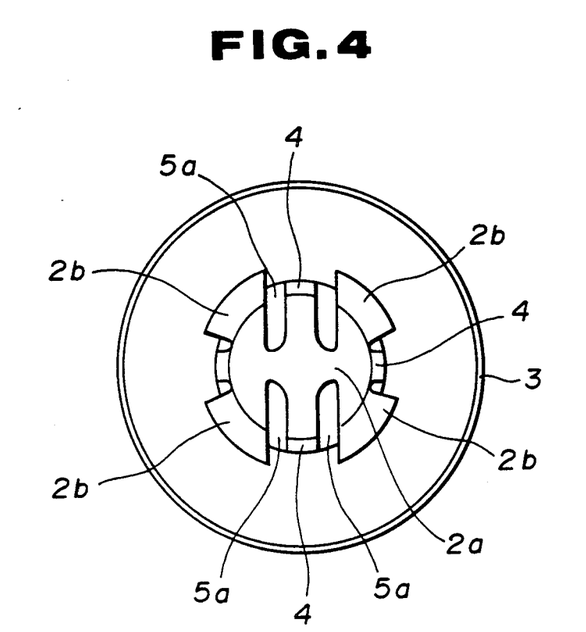
FIG. 4 is a bottom view of the same.
Figure 5:
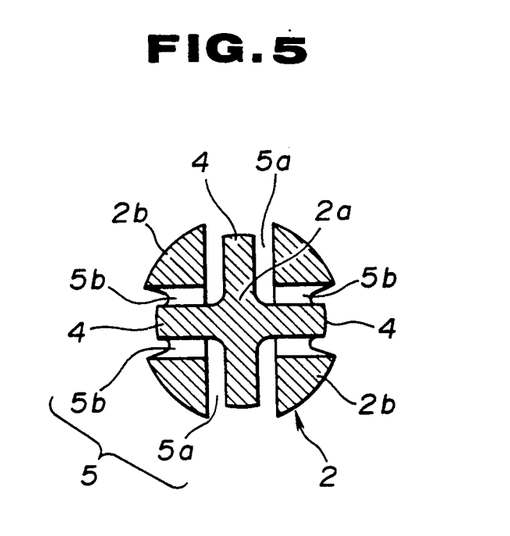
FIG. 5 is a sectional view taken on line 5—5 in FIG. 2.
Figure 6:
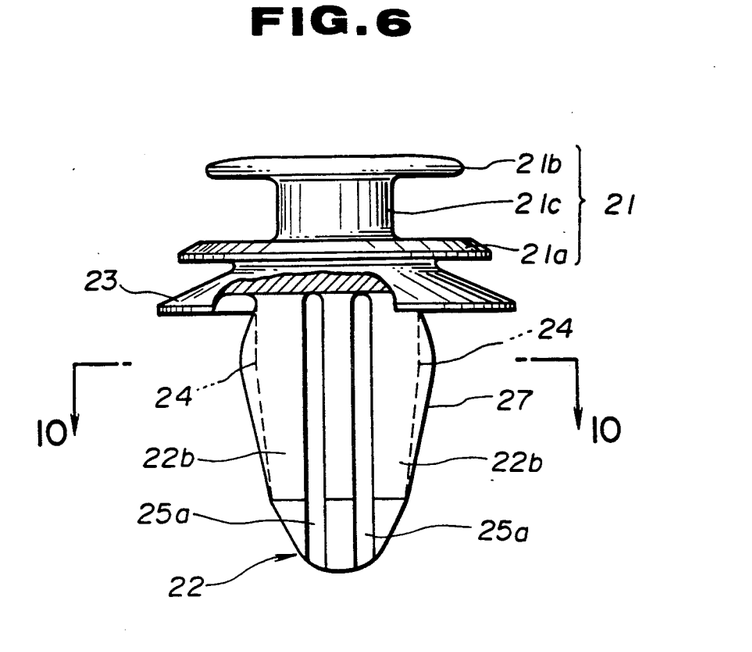
FIG. 6 is a partly cutaway front view of another embodiment of this invention.
Figure 7:
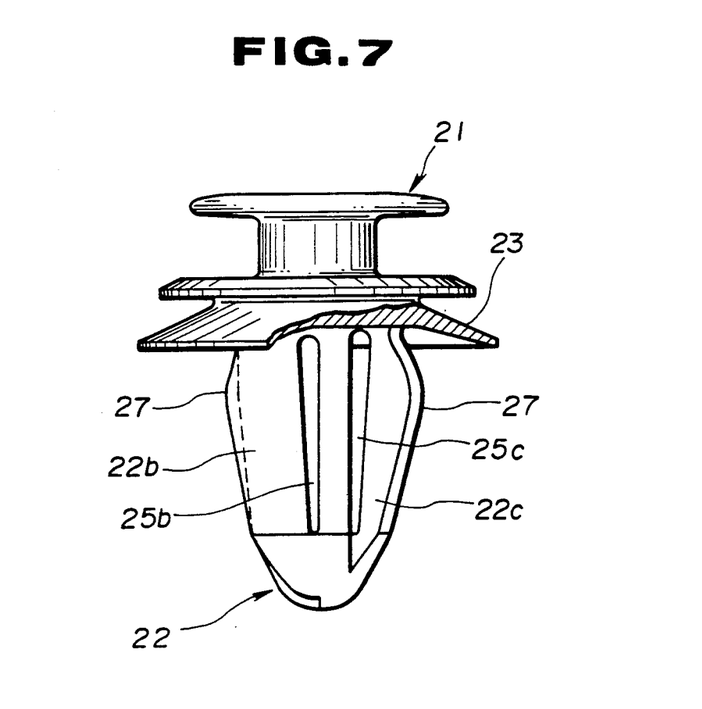
FIG. 7 is a partly cutaway right side view of embodiment of FIG. 6.
Figure 8:
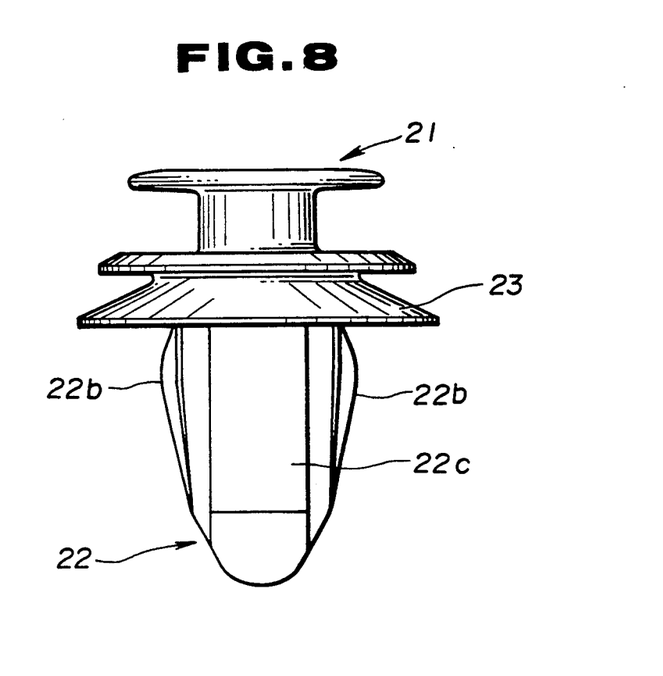
FIG. 8 is a rear view of the same.
Figure 9:
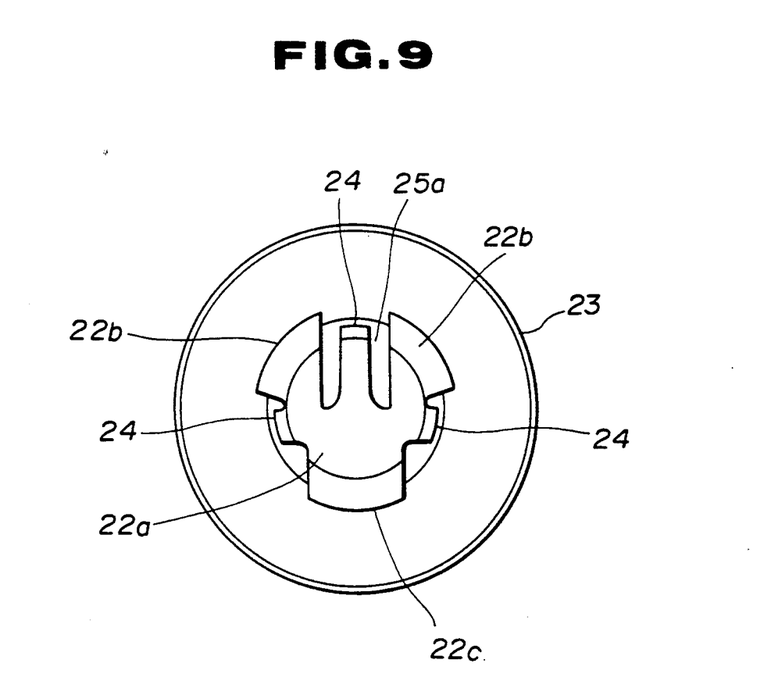
FIG. 9 is a bottom view of the same.
Figure 10:
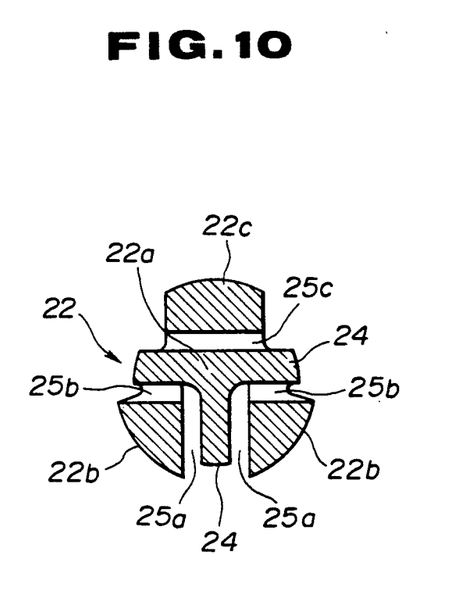
FIG. 10 is a sectional view taken on line 10—10 in FIG. 6.

The axial stem 2a in this embodiment is in the form of a column having a cross-shaped transverse cross section to have four fins 4 protruding radially outward, as shown in FIG. 5 and extends vertically downward from the lower surface of the umbrella-like seal member 3. The fins 4 protruding in opposite directions have outer side surfaces spaced apart a distance slightly smaller than the diameter of the fitting hole a formed in the panel A. That is to say, the width (length in the horizontal direction) of one fin 4 does not exceed the radius of the fitting hole so as not to produce frictional resistance between the outsides of the fins and the edge of the panel defining the fitting hole when inserting the leg portion 2 into the fitting hole.

The elastic engaging pieces 2b are respectively located in the respective spaces between the circumferentiall adjacent fins 4 of the axial stem 2a. Each engaging piece 2b is connected at its upper end to the lower surface of the seal member 3 and at its lower end to the lower end of the axial stem 2a, so that the middle part of the engaging piece 2b is spaced part from the periphery of the axial stem 2a so as to define a gap 5, as shown in FIG. 5. In this embodiment, the gap 5 consists of a slit 5a extending into the leg portion 2 from the front and a slit 5b extending into the leg portion form the side, which are perpendicular to each other. There is no substantial difference in function between the slits 5a and 5b, these slits are slightly different in configuration because of the restriction in plastic injection molding, and the configuration of the gap 5 should not be understood as imitative.

The four engaging pieces 2b each have an outer surface curved or shaped in an arc when viewed from above so that an imaginary circle circumscribes the curved surfaces. When viewed from the side, outer surface of the each engaging piece 2b is expanded aslant from the upper and lower ends of the engaging piece toward the about middle portion of its entire length so as to form a bulge portion 7 as the apex. The maximum width of the engaging pieces 2b, which is defined between the apexes of the opposite bulge portions 7, is made larger than the diameter of the fitting hole a bored in the panel A.

Also, the maximum width of the engaging pieces 2b is larger than the diameter of the imaginary circle circumscribing the outer surfaces of the axial stem 2a, as is apparent from FIG. 5. That is, the engaging piece 2b is elastically retractable in the radial direction to the extent within the space defined nearly by a difference between the maximum width of the engaging pieces 2b and the diameter of the imaginary circle circumscribing the outer surfaces the axial stem 2a.

When uniting the trim board B to the inside panel A of the car door, the board clamp made of synthetic resin or the like is mounted on the trim board B in advance. To be more precise, the board clamp is fixed onto the trim board B by inserting the upper flange 1b into a hook hole b bored in a hook portion C formed on the trim board B. The hook hole b formed in the trim board B, as one example of this embodiment, is shaped like a keyhole consisting of a round hole having a large diameter and a slot having a narrow width relative to the diameter of the upper flange 1b. Thus, the board clamp can be fixed on the trim board by first inserting the upper flange 1b into the large round hole of the hook hole b and then sliding it sideways into the the narrow slot of the hook hole b.

Upon fixing an adequate number of board clamps onto the trim board B in the way described above, the trim board B is placed facing the inside panel A of the car door while pointing the leg portions 2 of the board clamps toward the respective fitting holes a formed in the inside panel A. Then, the leg portions 2 are thrust into the fitting holes in the inside panel A by striking the trim board B from the reverse side with a mallet or the like. At this time, the leg portion 2 is inserted into the fitting hole a while allowing the engaging pieces 2b to resiliently retract inward by the circumferential edge of the panel defining the fitting hole and is guided by the rigid axial stem 2a. The bulge portions 7 of the engaging pieces 2b resume their original shape after passing through the fitting hole a, thereby steadily retaining the leg portion 2 in the fitting hole. To facilitate the insertion of the leg portion 2 into the fitting hole, the overall configuration of the leg portion 2 may be four-sided pyramid trapezoidal cone shape.

Referring to FIG. 6 through FIG. 10, the second embodiment of the present invention will be described hereinafter. In this embodiment, the board clamp fundamentally comprises a head portion 21 and a leg portion 22 having an axial stem 22a and a plurality of elastic engaging pieces 22b and 22c similar to the first embodiment described above.

The head portion 21 comprises vertically opposite flanges 21a and 21b and a neck portion 21c formed between the flanges 21a and 21b, so as to hold a first board or panel between the flanges 21a and 21b, similarly to the first embodiment.

The axial stem 22a has a substantially T-shape transverse cross section so as to have three fins 24 extending outward. The elastic engaging pieces 22b and 22c are respectively located in the respective spaces between the circumferentially adjacent fins 24 of the axial stem 22a. The engaging pieces 22b and 22c are connected at their upper ends to the lower surface of a seal member 23 and at their lower ends to the lower end of the axial stem 22a. Also, similarly to the first embodiment, the width of each fin 24 extending outward is slightly smaller than the radius of a fitting hole formed in a second board or panel (not shown in this illustrated embodiment), and each maximum width of the engaging pieces 22b and 22c is larger than the radius of the fitting hole. The engaging piece 22c is somewhat different in configuration from the engaging pieces 22b, but has the same function as the engaging pieces 22b. These engaging pieces 22b and 22c are resiliently retractable into slits 25a, 25b and 25c each formed between the circumferentially adjacent fins 24 of the stem portion 22a.

The outer surface of each of the engaging pieces 22b and 22c is expanded aslant from the upper and lower ends thereof toward about the middle portion of its entire length so as to form a bulge portion 27 as the apex. The maximum width of the opposite engaging pieces 22b is defined between the apexes of the bulge portions 27 thereof, and somewhat larger than the diameter of the fitting hole.

The board clamp of this second embodiment is used in the same manner as the first embodiment. Namely, the board clamp is first fixed onto the first board or panel by inserting the upper flange 21b into a hook hole bored in the first board, and then, the board with the board clamp is placed facing the second board or panel while pointing the leg portion 22 toward the fitting hole formed in the second board. Thereafter, the leg portion 22 is thrust into the fitting hole in the second board. At this time, the leg portion 22 is inserted into the fitting hole while the engaging pieces 22b and 22c are retracting inward by the circumferential edge of the board defining the fitting hole and guided by the rigid axial stem 22a. When passing the bulge portions 27 of the engaging pieces 22b through the fitting hole, the engaging pieces 22b and 22c resume their original shape, thereby steadily retaining the leg portion 22 within the fitting hole in position.

As described above with reference to the two embodiments, since the board clamp according to this invention has the leg portion consisting of the rigid axial stem and the elastic engaging pieces, various objects such as boards can readily be united firmly even if the opposite connecting portions having fitting holes do not completely agree with each other. Besides, the leg portion fitted into the fitting hole is hardly deformed or broken even when being inserted into the fitting hole slantwise to some extent or being subjected to a large load in all directions.

Although the head portion of the board clamp has the upper and lower flanges in the embodiments described above, the head portion may be formed by a single flange with hooking means and be designed in accordance with various uses. Furthermore, although the axial stem has a cross or substantially T-shaped transverse cross section in the illustrated embodiments, the shape of the axial stem is by no means limitative. For example, the rigid axial stem may have a substantially Y-shaped transverse cross section or any other shape as long as it have rigidity sufficient to guide the leg portion into the fitting hole and the elastic engaging pieces can be provided uniformly around the axial stem and in a radially retractable state within the spaces defined between the circumferentially adjacent fins constituting the axial stem.

Moreover, the umbrella-like seal member is provided between the leg portion and the head portion, but is by no means necessary to this invention and may be omitted so that the leg portion can be connected directly to the lower flange of the head portion.

As is apparent from the foregoing, since the leg portion of the board clamp according to this invention comprises the axial stem having sufficient rigidity and the elastically retractable engaging pieces arranged substantially uniformly around the entire circumference of the axial stem, the leg portion can readily be fitted into a fitting hole formed in a board or plate without being deformed or broken even when being inserted into the fitting hole slantwise to some extent, and various articles can be reliably secured to the board or panel with a simple operation even when the clamp received a large load in all directions. Furthermore, the board clamp having high reliability in its ability to secure the various parts or board-like objects can easily be formed by plastic injection molding or other possible molding techniques without a complicated molding die.

It is to be understood that the invention is not limited in its application to the details and arrangement of parts illustrated in the accompanying drawings, since the invention is capable of other embodiments and of being practiced or carried out in various ways. Also, it is to be understood that the phraselogy or terminology employed herein is for the purpose of description and not of limitation.

What is claimed is:

1. A board clamp formed of a plastic material, which comprises a head portion and a leg portion to be inserted into a fitting hole in a board or panel, said leg portion extending downward from said head portion and comprising an axial stem having a substantially cross-shaped transverse cross section so as to have a central portion and four fins extending radially outward from said central portion, and elastic engaging pieces arranged around said axial stem and having outer circumferential surfaces which collectively have a diameter larger than that of the outer diameter of said axial stem, each of said engaging pieces being located between circumferentially adjacent ones of said fins, and said elastic engaging pieces being supported so as to be spaced from the circumferential surface of said axial stem and retractable toward said circumferential surface.

2. The board clamp according to claim 1, wherein said leg portion has an overall configuration in the form of one of a substantially inverted cone and inverted four-sided pyramid.

3. The board clamp according to claim 1, wherein said head portion comprises an upper flange, a lower flange and a neck portion between the flanges, said upper flange being smaller in diameter than said lower flange.

4. The board clamp according to claim 1, and further comprising an umbrella-like elastic seal member between said head portion and said leg portion.

5. The board clamp according to claim 1, wherein said elastic engaging pieces are arranged circumferentially around said axial stem at substantially regular intervals.

6. A board clamp formed of a plastic material, which comprises a head portion and a leg portion to be inserted into a fitting hole in a board or panel, said leg portion extending downward from said head portion and comprising an axial stem having one of a substantially T-shaped and Y-shaped transverse cross section so as to have a central portion and three fins protruding radially outward from said central portion, and elastic engaging pieces arranged around said axial stem and having outer circumferential surfaces which collectively have a diameter larger than that of the outer diameter of said axial stem, each of said engaging pieces being located between circumferentially adjacent ones of said fins, and said elastic engaging pieces being supported so as to be spaced from the circumferential surface of said axial stem and retractable toward said circumferential surface.

7. The board clamp according to claim 6, wherein said leg portion has an overall configuration in the form of one of a substantially inverted cone and inverted four-sided pyramid.

8. The board clamp according to claim 6, wherein said head portion comprises an upper flange, a lower flange and a neck portion between the flanges, said upper flange being smaller in diameter than said lower flange.

9. The board clamp according to claim 6, and further comprising an umbrella-like elastic seal member between said head portion and said leg portion.

10. The board clamp according to claim 6, wherein said elastic engaging pieces arranged circumferentially around said axial stem at substantially regular intervals.

* * * * *